United States Patent [19]

Ip et al.

[11] 3,985,989
[45] Oct. 12, 1976

[54] METHOD AND APPARATUS FOR JOINING APPENDAGES TO A ZIRCONIUM ALLOY MEMBER

[75] Inventors: Anthony K. C. Ip; Kenneth Koyanagi, both of Peterborough, Canada

[73] Assignee: Atomic Energy of Canada Limited, Ottawa, Canada

[22] Filed: Aug. 15, 1975

[21] Appl. No.: 605,058

[30] Foreign Application Priority Data

Sept. 13, 1974 Canada............................ 209222

[52] U.S. Cl............................ 219/9.5; 219/10.41; 219/10.57; 219/85
[51] Int. Cl.²........................................ H05B 5/08
[58] Field of Search............ 219/9.5, 8.5, 10.41, 219/10.53, 10.57, 85 A; 228/194, 44.1

[56] References Cited
UNITED STATES PATENTS

| 3,085,141 | 4/1963 | Rossner | 219/9.5 |
| 3,406,310 | 8/1946 | Agule | 219/85 A X |
| 3,504,149 | 3/1970 | Dixon et al. | 219/85 A X |

*Primary Examiner*—Bruce A. Reynolds
*Attorney, Agent, or Firm*—Ronald G. Bitner

[57] ABSTRACT

A method and apparatus for joining zirconium alloy appendages, such as spacers, to zirconium alloy members, such as sheaths for nuclear fuel elements. The appendage, coated with a material that will form a eutectic with a zirconium alloy, is heated to a temperature sufficient to form a eutectic with the coating material. The appendage is heated in proximity with the member such that the member is also heated but to a temperature that is below the alpha to beta transformation temperature. The heated appendage and member are brought together and heating is continued to complete the joining process, again with the temperature of the member remaining below the transformation temperature. The invention provides that there is substantially no alpha to beta transformation of the member or other adverse thermal effects such as residual stresses, geometrical distortions, compositional changes in fuel materials, etc.

5 Claims, 2 Drawing Figures

METHOD AND APPARATUS FOR JOINING APPENDAGES TO A ZIRCONIUM ALLOY MEMBER

BACKGROUND OF THE INVENTION

This invention relates to a method and apparatus for joining a zirconium alloy appendage to a zirconium alloy member, and more particularly to a method and apparatus for joining a zirconium alloy appendage to a zirconium alloy member by brazing without substantial alpha to beta transformation of the zirconium alloy member.

In the current induction braze process of joining spacers, or other appendages onto the sheaths of nuclear fuel elements composed of zirconium alloy, the heat required to effect a satisfactory joint results in substantial alpha to beta transformation of the surrounding and/or underlying areas of the member to which the appendage is joined. The transformation of the member is difficult to avoid since the alpha to beta transformation temperature of zirconium alloy is lower than the required brazing temperature.

This transformed structure in the sheath limits the performance of the nuclear fuel elements. In addition to structural changes of the zirconium alloy material, heating of the member, to the extent of current practice, may have other adverse effects. For example, such heating of a nuclear fuel sheath may result in distortions that make it difficult to load the sheath with the fuel material, or, if applied to a member already containing the fuel material, may result in adverse reactions in the fuel material thus contained.

Methods of joining whereby the thickness of the transformed zone is reduced have been proposed. For example, in U.S. Pat. No. 3,085,141 to W. Rossner entitled "Hard-Soldering Method, Particularly for Joining Nuclear-Reactor Components," it is proposed that the uncoated member be heated to a temperature above the melting point while the coated member remains unheated. When joined, the temperature of the joined components drops rapidly. This method, involving rapid temperature drop, tends to result in high residual stresses which may well be detrimental to product performance, particularly under cyclic loading conditions. This method may also not result in sufficiently sound joints.

SUMMARY OF THE INVENTION

It is an object of the present invention to provide a method and apparatus for joining a zirconium alloy appendage to a zirconium alloy member whereby there is substantially no alpha to beta transformation of the member.

It is a specific object to join a zirconium alloy appendage to a zirconium alloy member in which the member is not to be subjected to a temperature above its phase transformation temperature but the appendage must of necessity be heated above this temperature in order to form a eutectic with a coating material.

Another object of the invention is to join zirconium alloy members such that residual stresses and distortion are minimized.

In accordance with the present invention a zirconium alloy appendage is joined to a zirconium alloy member by a method comprising: depositing a coating of a material that will form a eutectic with a zirconium alloy onto the joining surface of the appendage; heating the appendage in a non-oxidizing environment to a temperature sufficient to form a eutectic composed of the coating material and zirconium alloy of the appendage, and simultaneously heating the member in the region to be joined to a temperature below the transformation temperature thereof; bringing the heated appendage and the member together to effect joining; and continuing heating of the joined appendage and member, whereby the temperature of the member remains below the transformation temperature, in order to complete the joining process.

In a specific embodiment of the invention the heat is provided by electrical induction means.

The present invention also provides an apparatus for carrying out the above method.

DESCRIPTION OF THE PREFERRED EMBODIMENT

Figure 1:
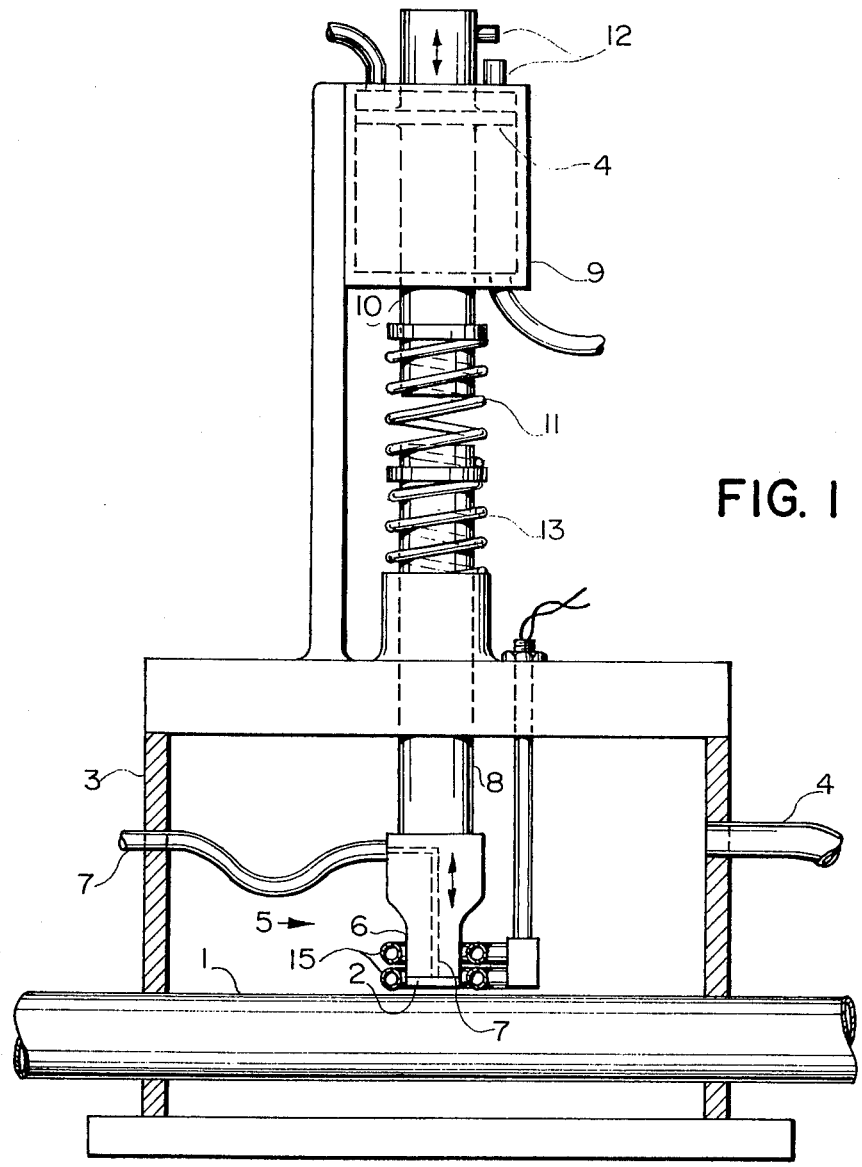
FIG. 1 is an elevational view of an apparatus for joining an appendage to a zirconium alloy member.

With reference to FIG. 1, a fuel sheath 1, the member to which an appendage 2 is to be joined, is positioned with the region at which the joint is to be made enclosed within a non-oxidizing environment defined by the enclosure 3. The non-oxidizing environment may be provided by introducing an inert gas, such as argon, through a suitable inlet 4, or alternatively by evacuation of the enclosure 3.

An appendage manipulating device 5 supports and applies the appendage 2 to the member 1 during the joining process. The appendage 2 is held to the bottom of a ceramic holder 6 by applying a vacuum through the conduit 7. The appendage holder 6 is attached to a shaft 8 which travels up and down in response to the action of the piston 4 in the pneumatic cylinder 9. The force on the piston 4 is transferred from shaft 10 to shaft 8 by the force spring 11, with travel limited by stop means 12. Return of the shaft 8 to the upward position is facilitated by the return spring 13.

The heat for joining is provided by electrical induction heating coil means 15 which surrounds the appendage 2 and is spaced in proximity with the member 1.

For the joining process the zirconium alloy appendages are prepared by coating with a material that will form a eutectic with a zirconium alloy. The coating may be applied by vapour deposition, or other known methods.

In operation, the coated appendage 2 is positioned in proximity with the member 1 by means of the appendage manipulating device 5. The energized induction heating means 15 surrounding the appendage 2 heats the appendage to a temperature sufficient to form a eutectic composed of the coating material and the zirconium alloy appendage. The appendage 2, as it is being heated, is positioned in proximity with the member 1 such that the region of the member to which the appendage is to be joined is also heated by the heating means 15. The arrangement is such that the member is heated to a temperature which is below the transformation temperature. The appendage manipulating device 5 brings the heated appendage into contact with the member by the downward forcing stroke of the piston 4. The force and speed of travel of the appendage against the member must be limited to prevent dimpling of the member and/or splashing out of an excessive amount of the coating material. The actual pneumatic force applied to the piston 4 itself will be governed by the spring system as well as the above limitations. After the appendage is applied against the sheath, heating is continued to complete the joining process, the heat input being such that the member remains below the transformation temperature. The continued heating increases the strength, and consistancy of strength of the joint. After completion of the heating cycle, the pneumatic pressure is released and the return spring 13 effects separation of the holder 6 from the appendage 2 which is now joined to the member 1.

Preferably the alloy used for the appendage will be the same as that of the main constituent of the member. Examples of zirconium alloys suitable for the present invention are: zircoloy -2 and -4, zirconium – 2.5% niobium, zirconium – 1% niobium, and zirconium – 1.5% chromium – 0.1% iron. The preferred material for coating the appendage is beryllium but may include any other material that will form a eutectic with a zirconium alloy such as manganese, iron, steel and copper.

EXAMPLE

A sheath for nuclear fuel elements, onto which spacer pads were joined, comprised a Zr – 1% Nb tube, 15 mm in diameter, 0.5 mm thick and 50 cm long. The sheath material has an alpha to beta transformation temperature of 830° C. The spacers, composed of Zr – 1% Nb, were 0.8 mm thick, 2.5 mm wide, 9 mm long and had a 7.5 mm radius of curvature. The spacers were coated with beryllium which forms a Be – 5% Zr eutectic at 1000° C. Using an apparatus similar to that shown in FIG. 1, the sheath was placed in an enclosure supplied with argon at 40 psi. Heating means comprised a hgh frequency generator that supplied 0.5 to 1.0 Kw of power to a 13 mm diameter heating coil comprising 2 turns of 3 mm diameter copper tubing. The bottom of the heating coil and the bottom of the spacer were positioned 3 mm from the sheath. Power to the coil was applied for 12 seconds with th spacer spaced from the sheath. During this time the spacer was heated to the required eutectic forming temperature, 1000° C, forming a eutectic with the coating. Subsequently, the spacer was forced against the sheath and the heating continued for a further 15 seconds during which time the sheath temperature rose to 650° C as measured by a Cr/Al thermocouple attached to the inner wall of the sheath. The appendage holder consisted of lava ceramic shaped to accomodate the geometry of the appendage. The appendage was applied by an air cylinder having a 38 mm bore and supplied with 8 psig pressure on the downward stroke. The air cylinder operated against a spring comprising 6 turns of 1 mm diameter spring steel having a 19 mm outside diameter and a free length of 25 mm.

Figure 2:
FIG. 2 is a microphotograph of a portion of an etched transverse section through a nuclear fuel sheath showing an appendage joined to the sheath in accordance with the present invention.

FIG. 2 is a microphotograph of a spacer pad 21 joined to a nuclear fuel sheath 22 using the method and apparatus described in the previous example. It will be noted that the spacer pad 21 has been transformed from the original alpha phase to the beta-structure as a result of the heating which was required to form the eutectic 23. However, the sheath 22 retains the unaltered alpha-structure with no significant beta-structure adjacent to the appendage.

The apparatus and process of the present invention is not to be limited by values given in the example. The process parameters such as heat input, heating time, spacing of heating coil and appendages to the sheath surface, speed and force of applying the appendage, contact force, time and heat input during brazing will be determined by the particular application and will be dependent on the characteristics of the apparatus used, the characteristics of the parts to be joined (material, geometry, mass, etc.) and the desired joint quality (degree of transformation, acceptable joint strength, corrosion resistance, etc.).

What is claimed is:
1. A method of joining a zirconium alloy appendage to a zirconium alloy member comprising:
 a. depositing a coating of material that will form a eutectic with a zirconium alloy onto the joning surface of the appendage;
 b. heating the appendage in a non-oxidizing environment to a temperature sufficient to form a eutectic composed of the coating material and zirconium alloy of the appendage, and simultaneously heating the member in the region to be joined to a temperature below the transformation temperature thereof;
 c. bringing the heated appendage and the member together to effect joining; and
 d. continuing heating of the joined appendage and member, whereby the temperature of the member remains below the transformation temperature, in order to complete the joining process.

2. The method of claim 1 wherein heating means is provided by means of an induction coil surrounding the appendage, and wherein the appendage is positioned in proximity with the member such that the joining region of the member is also heated.

3. The method of claim 1 wherein the coating material is beryllium.

4. An apparatus for joining a zirconium alloy appendage, coated with a material that will form a eutectic with a zirconium alloy, to a zirconium alloy member, comprising:
 a. member supporting means;
 b. means for movably supporting the appendage at a predetermined distance from the member;
 c. heating means for heating the appendage to a temperature sufficient to form a eutectic composed of the coating material and the zirconium alloy of the appendage, said heating means being disposed in proximity to the member such that the member, in the region where joining is to take place, is also heated but to a temperature below the transformation temperature thereof;
 d. means for forcing the heated appendage against the member to effect joining; and
 e. enclosure means for providing a non-oxidizing environment while the appendage is being heated and joined.

5. The apparatus of claim 4 wherein said heating means comprises an induction heating coil adapted to surround the appendage and wherein the central axis of the coil is substantially perpendicular with the surface of the member.

* * * * *